United States Patent [19]

van Hüllen

[11] 4,222,724

[45] Sep. 16, 1980

[54] MULTI-PLATEN PRESS FOR PRESSING CHIPBOARDS AND THE LIKE WITHOUT SPACER STRIPS

[75] Inventor: Kurt van Hüllen, Krefeld, Fed. Rep. of Germany

[73] Assignee: Niederrheinische Maschinenfabrik Becker & van Hüllen, Krefeld, Fed. Rep. of Germany

[21] Appl. No.: 967,774

[22] Filed: Dec. 8, 1978

[51] Int. Cl.$^3$ .................... B29J 5/08

[52] U.S. Cl. .................... 425/141; 425/338

[58] Field of Search .................... 425/338, 135, 141

[56] References Cited

U.S. PATENT DOCUMENTS

| | | | |
|---|---|---|---|
| 3,518,724 | 7/1970 | Book | 425/338 |
| 3,826,601 | 7/1974 | Hütter | 425/338 |
| 3,840,314 | 10/1974 | Book | 425/338 |

*Primary Examiner*—Donald E. Czaja

*Assistant Examiner*—James R. Hall

*Attorney, Agent, or Firm*—Herbert E. Kidder

[57] ABSTRACT

A multi-platen press having a stationary press table, a movable press table and a simultaneous closing device, the same stroke between the stationary and movable press tables being maintained by having at least one cylinder on each corner of the movable press table, and by having a separate control device associated with each of the cylinders. The control devices are mounted on the press adjacent the corner of the movable table to which its respective cylinder is connected, and each control device is independently adjustable toward or away from the stationary press table. The control devices are each actuated by the movable table to stop the operation of its associated cylinder when the corresponding corner of the movable table reaches a specified distance from the stationary table.

1 Claim, 3 Drawing Figures

MULTI-PLATEN PRESS FOR PRESSING CHIPBOARDS AND THE LIKE WITHOUT SPACER STRIPS

RELATED APPLICATIONS

This application is a substitute application for my earlier application, Ser. No. 889,470, filed Dec. 31, 1969, now abandoned.

BACKGROUND OF THE INVENTION

The present invention pertains to a multi-platen press for pressing chipboards and the like without spacer strips, with a stationary and a movable press table, between which the individual press stages are mounted.

There has been a requirement for a long time to produce chipboards or the like without spacer strips, which are located between the individual press stages in order to maintain the exact thickness of the plates to be pressed. In spite of extensive trials, however, pressing without spacer strips presents still extraordinary difficulties. The tolerances in the thicknesses of the pressed plates were such that it was only possible to work with substantial additional tolerances and these had to be equalized to the correct thickness by grinding down after the pressing. It needs no special explanation that this leads to a great amount of waste of material. Apart from that, this type of pressing is rather expensive. Hence, generally, spacer strips are used in order to ensure the correct dimensioning of the pressed plates.

On the other hand, however, the use of spacer strips brings about certain difficulties during the pressing. Thus, for example, for different thicknesses of the plates to be pressed, the spacer strips must always be exchanged. A particular disadvantage is that during the closure of the press, chips may be trapped between the stage plates and the spacer strips so that variations in the thickness may occur also in this case. It is therefore necessary to provide special equipment, whereby such obstacles may be removed just before the press is closed. These constructions are rather expensive.

SUMMARY OF THE INVENTION

For this reason, there has been the requirement of performing this operation without the use of spacer strips. The invention provides a solution of this problem by means of a multi-platen press in which the movable press table has, at each of its four corners, at least one press cylinder, which is controlled by a control device arranged above each cylinder, in order to adhere exactly to the same stroke, and wherein the press is equipped with a simultaneously acting closing mechanism.

Practical tests have shown that by means of such a press, satisfactory pressing of chipboards is possible with only small deviations from the desired thickness of the plate. Obviously, this is due to the fact that, apart from the simultaneous closure of the individual stages, the individual control of the different pistons on the press table enable the gap between the movable lower press table and the fixed upper press table to be controlled with such accuracy that the distance between the movable lower press table and the fixed press table remains exactly the same over the entire press surface.

The simultaneous closing mechanisms may be known mechanisms of this type. Preferably, the most proved construction will be used in which there are mounted, on each of two opposite sides of the press, on the upper press table, at least one arm pivotable about a horizontal pivot, and on the lower vertically movable press table a pressure or push rod each articulately connected to the free end of the associated pivot arm, wherein the individual press stages are articulately connected by suitably arranged pull members with the pivoting arms. The pull members act in the sequence of the stage plates from the top towards the bottom at proportionately increasing distances from the pivot of the associated pivoting arm. During the closing of the press by raising the lower press table, the pivoting arms are pushed upwardly by the push rods and thereby lift simultaneously the pull rods of the individual press platens at different speeds so that the whole press closes simultaneously in all platens.

According to a further feature of the invention, the simultaneous closing device is additionally equipped with a known device for compensating the platen weight. In this case, even better pressing results are achieved, because exactly identical pressure conditions are obtained in all press platens.

The invention will now be more fully described by way of example with reference to the accompanying drawings, wherein:

DESCRIPTION OF THE PREFERRED EMBODIMENT

Figure 2:
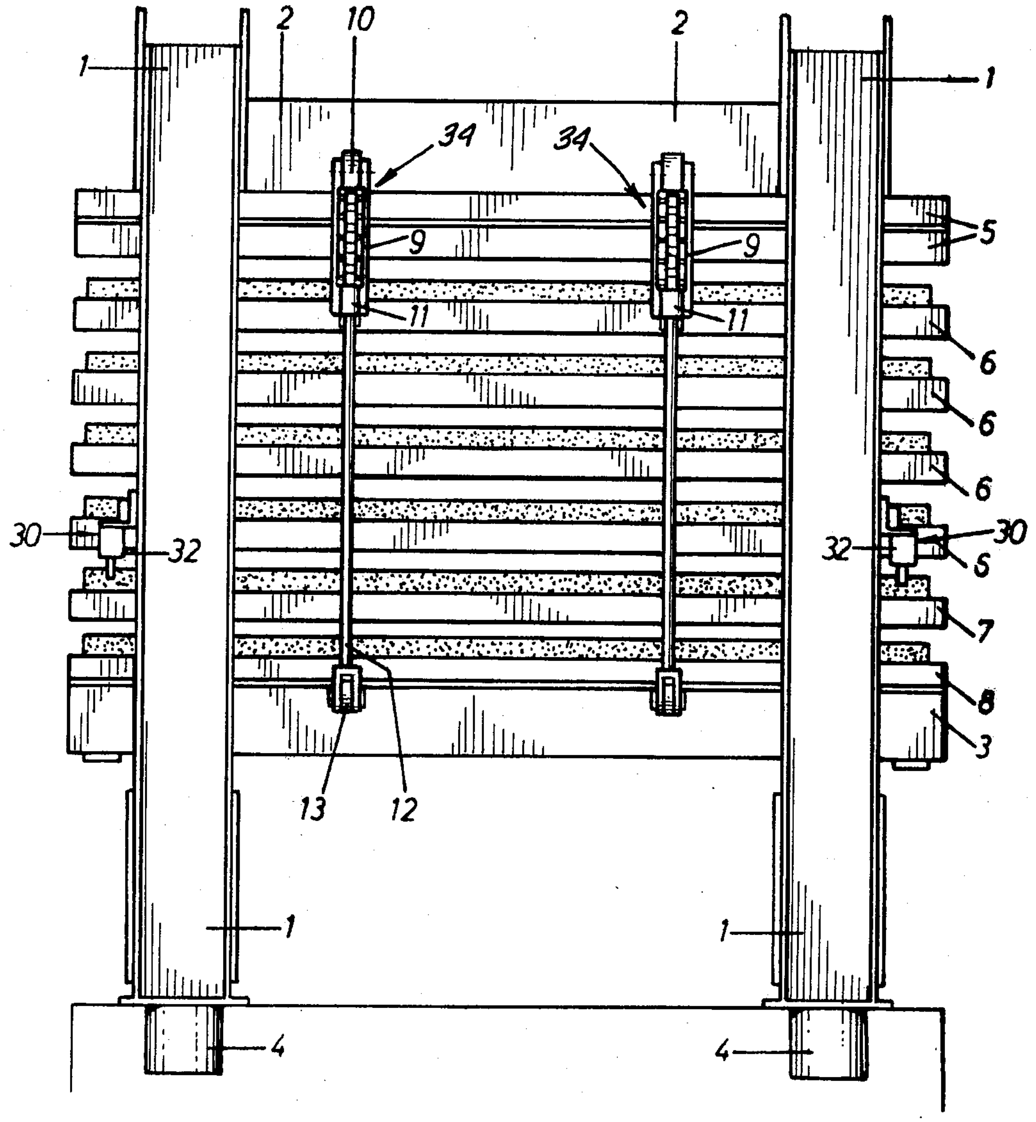
FIG. 2 is a side elevation of the press in the open state.

In the multi-platen press shown in the drawings, a main frame 1 carries, as known in the art, a stationary upper press table 2 and a vertically movable lower platen forming a press table 3, wherein hydraulic press cylinders 4 are provided for the upwardly directed working stroke of the press table 3 and for its return movement from the top towards the bottom for opening the press, with one such cylinder being arranged at each corner of the press table 3 (see FIG. 2). Each cylinder 4 is so controlled through a control device 30 arranged on the side of the press that all cylinders maintain exactly the same stroke. This ensures the accurate, simultaneous closure of the press over the entire press surface. In the direction from the top towards the bottom, the reference numerals *6a, 6b,* etc., and 7 indicate the top platens and *6a, 6b,* etc., and 8 the base plates of the individual stages of the press. For the sake of clarity, the drawing shows only six platens, whereas in a practical embodiment there may be 20 platens or even more. As known in the art, the top platen 5 of the uppermost stage is rigidly connected to the upper press table 2 and the base plate 8 of the lowermost stage is rigidly connected to the press table 3.

At each long side of the press, the upper press table 2 has a pair of simultaneous closing devices 34, each of which includes fork-like arms 9, which are mounted pivotably about a horizontal pivot 10. Connected articulately to the free end of each pivoting arm 9 at 11 is a push rod 12, the lower end of which is hinged at 13 to the press table. For holding and raising the stage platens 6 and 7 which may, when the press is open, also rest on abutment supports arranged on the main frame 1, there are provided pull members in the form of rods 14, hinged at 15 to the associated stage platens.

Figure 1:
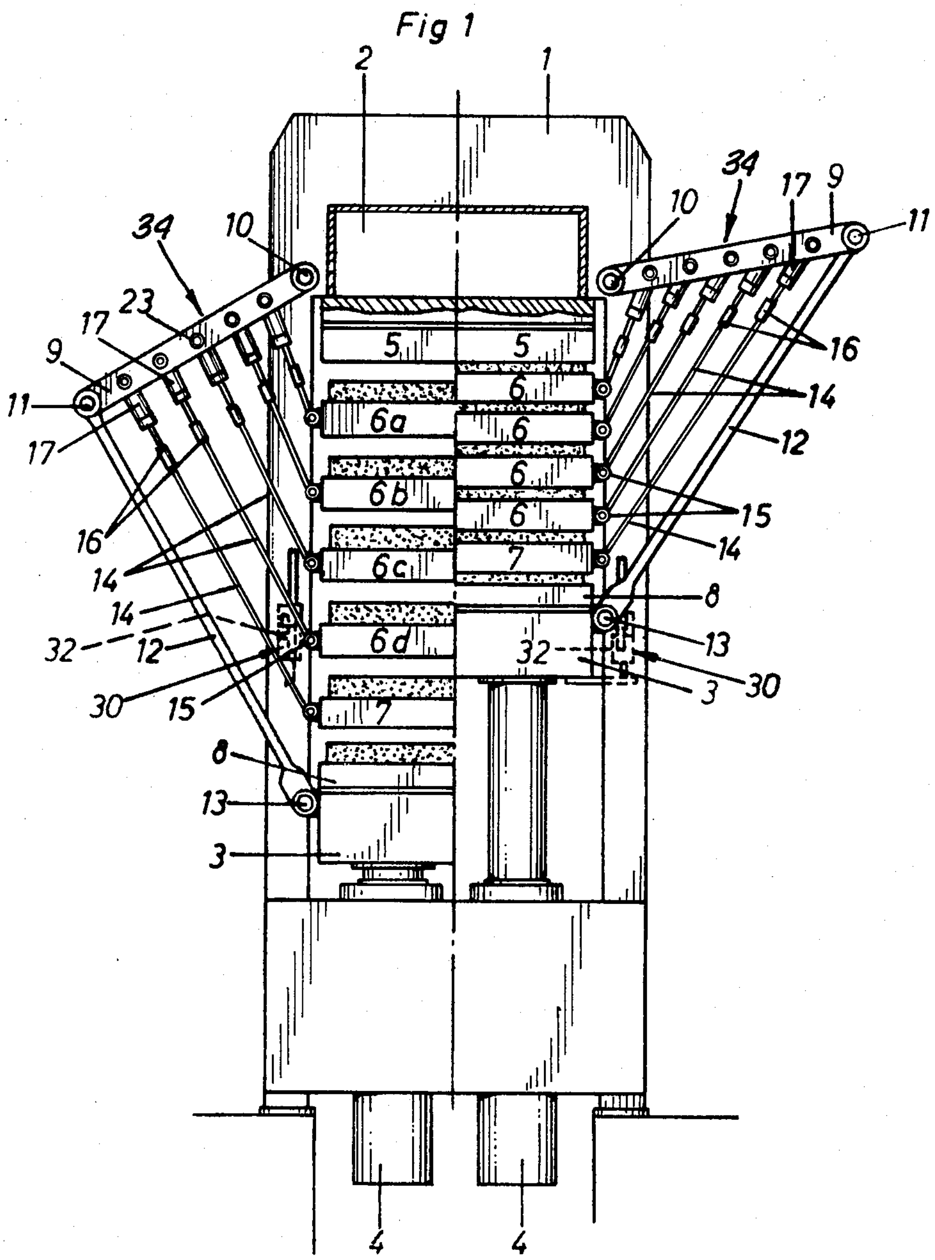
FIG. 1 is a partly sectionalized front elevation of the press, with the left half of the figure in the open state and the right half of the figure in the closed state.
Figure 3:
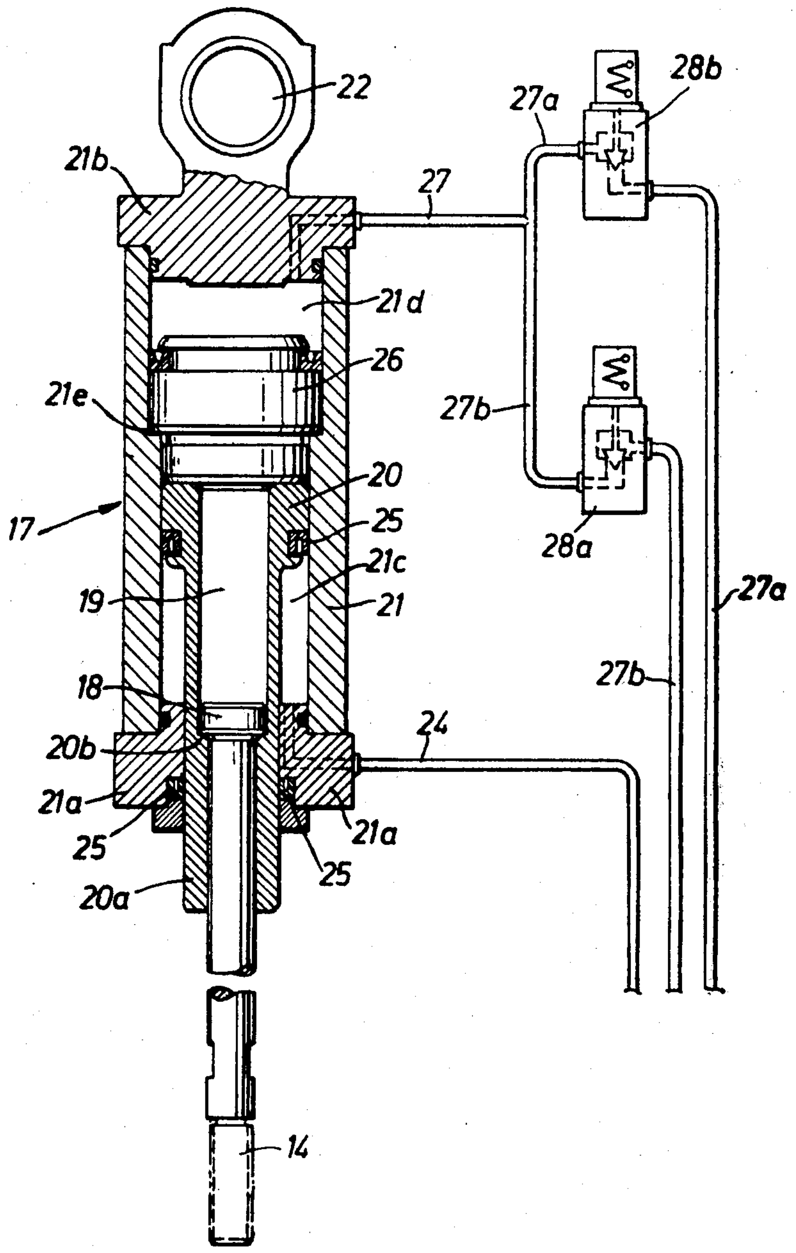
FIG. 3 shows the hydraulic working cylinder of an equalizing device for compensating the platen weight, in longitudinal cross-section.

Each rod 14 has an extension lock 16 or the like, by means of which it can be set at a certain structural length, and an equalizing mechanism shown generally at 17. The piston-like, enlarged upper end 18 of each rod 14 is guided in a bush-shaped cavity 19 of a piston 20 (FIG. 3). The piston 20 is slidably mounted within a working cylinder 21 and passes through the lower end wall 21*a* of the cylinder 21 with its lower part 20*a*, forming the guide for the cooperating rod 14. On the upper cylinder end wall 21*b*, there is an eyelet 22, whereby the cylinder 21, and with it the rod 14, connected thereto by the piston 20 and the enlarged end 18 of the rod, is articulately connected at 23 with the associated pivoting arm 9 (FIG. 1).

The piston 20 forms at the point where its cavity 19 passes from its bush-shaped upper portion into the restricted lower portion serving as a guide for the associated rod 14, a shoulder 20*b* which normally supports the enlarged end 18 of the rod 14. The working chamber 21*c* of the cylinder 21, left free by the piston 20, may be supplied with working medium through a conduit 24, whereby the hydraulic medium acts from the bottom, i.e., in the direction towards the associated pivoting arm 9, on the piston 20. By means of suitable piston seals 25 it may be easily accomplished that the hydraulic medium cannot escape either towards the top into the piston cavity 19, or towards the bottom, from the working chamber of the cylinder 21.

The working cylinder 21 is stepped so that its upper portion forms a working chamber 21*d* with a larger cross-sectional area than the chamber 21*c*. In this part 21*d*, a piston 26 is guided, serving as counter-support for the piston 20. The working chamber 21*d* communicates with a conduit 27 which is divided into a part 27*a* and a part 27*b*. Each forked portion 27*a* and 27*b* contains a valve 28*b* and 28*a*, respectively, such as, for example, a magnetic valve.

The conduits 24 and 27 lead to a common oil accumulator, not shown. Since the working surface of the counter-support piston 26 is substantially larger than that of the piston 20, bilateral pressure on the piston 26 will form a support for the piston 20.

However, the complete ejection of the piston 20 towards the bottom is prevented in that the movement of the piston 26 is limited by a step 21*e* provided in the cylinder 21.

The functioning of the equalizing mechanism is as follows: During the closure of the press from the fully open position, the conduits 24 and 27*b* carry the same pressure. The valve 28*b* is opened, while the valve 28*a* is closed. In this manner, the same pressure prevails in the working chambers 21*c* and 21*d*. Owing to the above-mentioned ratio between the cross sections of the affected surfaces for the piston 20 and the piston 26, the piston 26 becomes a counter-support for the piston 20 which can therefore only move up to the underside of the piston 26. The pulling force of the piston 20 is so adjusted by means of the affecting pressure that it exceeds the weight of the plates plus the weight of the material to be pressed in the individual press stages.

After the closing process has been terminated and the actual pressing stroke at higher pressure starts, the equalizing mechanism is reversed by means of a control, not shown. The valve 28*b* closes and the valve 28*a* opens so that the working chamber 21*d* is depressurized and the counter-support is detached. As fluid pressure acting against the top of piston 26 is relieved, the piston is no longer held firmly down against stop 21*e* and is allowed to yield upwardly when pressure is exerted against it by piston 20. As a result, the piston 20 always assumes a position such that the enlarged end 18 of the rods 14 rests on the shoulder 20*b* of the piston 20, thereby fully compensating for the weight of the heating plates.

For opening the press, the counter-support is again locked by pressurizing the piston 26, ensuring thereby the simultaneous opening of the press.

The heart of the invention lies in the provision of separate hydraulic cylinders 4 at the four corners of the movable press platen, each controlled by a separate control device 30, which ensures that all four of the pistons have identically the same stroke, so that at the top of its travel, the movable base plate 8 remains parallel to the stationary top platen 5. The control device 30 might take any of various forms. For example, adjustable limit switches 32 might be provided on the press frame adjacent each of the four cylinders. These limit switches would be adjustable to any desired distance from the top platen 5, and would normally be set at exactly the same distance from the said platen. As the pistons reach the top end of their travel, the switches 32 are actuated by their respective pistons, and this causes the cylinder valve to close, stopping the piston at that point. The result is an accurate, simultaneous closure of the press over the entire press surface. Another important feature of the invention is the simultaneous closing device 34 for closing all of the press platens together to equidistant spacings without the use of spacer strips.

What I claim is:

1. A multi-platen press without spacer strips between individual press plates for pressing chipboard comprising:
   - a stationary upper press table;
   - a rectangular movable lower press table having four corners;
   - a plurality of movable platens interposed between said upper and lower press tables, said platens being adapted to receive material between them for pressing chipboards;
   - at least one press cylinder on each of the four corners of said movable press table, said cylinders being operable to raise the movable press table toward said stationary press table;
   - a separate control device associated with each of said cylinders to regulate the length of stroke of each cylinder so that all of the cylinders have precisely equal-length strokes, each of said control devices being mounted on the press adjacent the corner of said movable table to which its respective cylinder is connected, and each of said control devices being independently adjustable toward or away from said stationary upper press table, said control devices each being actuated by said movable table to stop the operation of its associated cylinder when the corresponding corner of the movable table reaches a preselected distance from said stationary table; and
   - a simultaneous closing device for causing all of said plurality of platens to close simultaneously to equidistant spacing with regard to one another.

* * * * *